US008924402B2

United States Patent
Fuh et al.

(10) Patent No.: US 8,924,402 B2
(45) Date of Patent: Dec. 30, 2014

(54) GENERATING A TEST WORKLOAD FOR A DATABASE

(71) Applicant: International Business Machines Corporation, Armonk, NY (US)

(72) Inventors: You-Chin Fuh, San Jose, CA (US); Shuo Li, Beijing (CN); Heng Liu, Beijing (CN); Michael Schenker, San Jose, CA (US); Ke Wei Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/647,122

(22) Filed: Oct. 8, 2012

(65) Prior Publication Data

US 2013/0159353 A1 Jun. 20, 2013

(30) Foreign Application Priority Data

Dec. 20, 2011 (CN) .......................... 2011 1 0429529

(51) Int. Cl.
  *G06F 17/30* (2006.01)
  *G06F 21/62* (2013.01)

(52) U.S. Cl.
  CPC ................................. *G06F 21/6254* (2013.01)
  USPC ........................................................ 707/757

(58) Field of Classification Search
  CPC .................................................. G06F 21/6254
  USPC ........................................................ 707/757
  See application file for complete search history.

(56) References Cited

U.S. PATENT DOCUMENTS

| | | | |
|---|---|---|---|
| 7,299,220 B2 | 11/2007 | Chaudhuri et al. | |
| 7,636,707 B2 | 12/2009 | Chaudhuri et al. | |
| 7,840,555 B2 | 11/2010 | Burger et al. | |
| 8,024,299 B2 | 9/2011 | Dias et al. | |
| 8,024,339 B2 | 9/2011 | Barker et al. | |
| 2007/0250524 A1 | 10/2007 | Le | |
| 2008/0098003 A1* | 4/2008 | Dias et al. | 707/10 |
| 2010/0094829 A1 | 4/2010 | Castellanos et al. | |

OTHER PUBLICATIONS

LeFevre, et al. (Apr. 2006). Mondrian multidimensional k-anonymity. In Data Engineering, 2006. ICDE'06. Proceedings of the 22nd International Conference on (pp. 25-25). IEEE.*
LeFevre, et al. (Aug. 2006). Workload-aware anonymization. In Proceedings of the 12th ACM SIGKDD international conference on Knowledge discovery and data mining (pp. 277-286). ACM.*
Samarati et al. (1998). Protecting privacy when disclosing information k-anonymity and its enforcement through generalization and suppression. Technical report, SRI International.*
Wu, X. et al., "Privacy Aware Data Generation for Testing Data base Applications," 9th Int'l Database Engineering and Application Symposium (IDEAS) Jul. 25-27, 2005, pp. 317-326.

* cited by examiner

*Primary Examiner* — William Spieler
(74) *Attorney, Agent, or Firm* — Cuenot, Forsythe & Kim, LLC

(57) ABSTRACT

A method of transferring files in a data-processing network using a current node within the network includes reading an outbound content and outbound characteristics of an outbound file. An outbound message is created having outbound strings including a first set of the outbound strings representing the outbound characteristics and a second set of the outbound strings representing the outbound content. The outbound message is sent to a receiver node within the network. An inbound message is received from a sender node within the network. The inbound message has inbound strings including a first set of the inbound strings representing inbound characteristics and a second set of the inbound strings representing inbound content. An inbound file having the inbound content is stored, and the inbound characteristics are applied to the inbound file.

20 Claims, 7 Drawing Sheets

GENERATING A TEST WORKLOAD FOR A DATABASE

CROSS-REFERENCE TO RELATED APPLICATIONS

This application claims the benefit of China Application Number 201110429529.1, filed on Dec. 20, 2011, which is incorporated herein by reference in its entirety.

BACKGROUND

1. Field

The present disclosure relates to data processing, particularly to a database, and more particularly to a system and method for generating a test workload for a database.

2. Description of the Related Art

Currently, a huge amount of applications are running on data stored in database management systems. With increasing complexity of software, how to ensure high quality of these applications becomes a critical issue. And it is not just the applications which get more complex, but also the database management systems themselves. Those database management systems often store mission-critical data which is accessed and updated by many different applications and thousands of users. An outage of the database management system has often serious consequences to the core business—it can cost a company millions of dollars, lost of trust by customers and business partners as well as legal implications. In the worst case it can even put a company out of business. Therefore it's inevitable and mission critical to provide sufficient database testing methodologies. It's not just critical for companies who are database end-users to have easy access to such database testing methodologies but also for application middleware vendors as well as the database vendors themselves.

A critical point of a database-centric testing is the availability of "real-world" workloads since it is extremely difficult to artificially generate sufficient data and access patterns of a production system due to the complexity of the applications and environments today.

There is also an increasing need to make such real-world workloads and the corresponding testing tools more available for third parties. For example a company might out-source its application database testing to a service provider, which is also known as "Test as a Service". This raises data confidentiality and security concerns. A company is most likely not willing to expose its core business data to non-trusted parties. But even inside the company data access is heavily restricted. People who develop and test application usually don't have access to the real business data.

Several solutions for collecting and/or generating workloads exist already today, but they are limited in their usage, either due to data confidentiality issues or because of insufficient modeling of the real-world environment. In addition many of those solutions lack the ability to correlate database data and statements which disqualifies such solutions for a real end-to-end testing scenario Application-driven testing requires re-creating the, mostly complex, production system in a test environment. This approach requires huge efforts in time and resources to re-build the environment. Such a solution is not very portable since the production environments are very unique and hard to re-build. In addition test data generation can be an issue as well since the data may still contain confidential information if derived from the production system. Finally the simulation of the real-work workload is a problem since appropriate application drivers need to be hand-crafted Another approach is the so-called "Capture and Replay". Here the communication between the application and the database is intercepted and recorded. Later on the recorded statement flow can be replayed on a database image taken when the recording started. However, this solution requires that the data store used for the replay represents the exact same state (including all the data) as during the capture phase. This makes the solution not very portable and available due to confidentiality issues and the "locked-in" environment which makes it hard to test migration and scale-up/down scenarios. It's difficult to deviate from the recorded flow. In addition such capture and replay solutions will not work on artificially generated data.

Currently, there are several different approaches to create database test data as follows:

1) Random test data generation. The generated data usually makes no sense, as a result, it is almost impossible to design a good test workload based on the data to achieve test goals, neither from a functional nor from a performance perspective.

2) Data masking. Many products offer data masking functions. However, data masking is usually only used within a customer site because with a large amount of database objects, it is not practical to completely ensure privacy information and it's not considered to be safe sharing the masked data with third parties outside the customer's security and privacy boundaries. In addition it requires time and resources to learn and work with the masking tool to generate the appropriate masks. Meanwhile, data masking may break the order of data so that some queries in the original workload cannot be used for testing directly.

3) Profiling and populating script. Testers write their own data generation script based on predefined test strategies. For example, testers generate a profile recording table sizes or column distinct values by running profiling scripts, then insert data into the target system according to the profile. This approach requires testers to learn the application very well and to spend a significant amount of time on the test data generation project.

BRIEF DESCRIPTION OF THE SEVERAL VIEWS OF THE DRAWINGS

The appended claims set forth inventive features believed characteristic of the present invention. However, the present invention itself, and preferred modes of use, objectives, features, and advantages thereof may be better understood through the detailed description below of illustrative embodiments when read in conjunction with the accompanying drawings, in which:

DETAILED DESCRIPTION

One disadvantage of all the test data generation approaches of the prior art is that they do not take the SQL statements and application workflow into consideration which often disqualifies them from being a sufficient end-to-end solution. Thus, inventors have recognized a need for a solution which can generate easily a portable and generic end-to-end workload for database testing.

The present invention proposes a solution for generating or cloning a test workload based on completely non-confidential meta information of the data involved in a real-world application workload, wherein the workload refers to a set of database statements in the application executed upon data in a database, and the flow thereof. The generated test workload provides a portable and accessible end-to-end solution, which has no issue of data confidentiality, but retains the characteristics in the source environment necessary for functional and performance testing.

Due to extensive analysis and correlation of the workload statements and the data's metadata, like the schema and statistics, it is possible to generate test data which is free of confidential information, yet the generated data still maintains the real-world characteristics in regards to data distribution, frequency and join relationships. In addition the SQL statements and parameter values are mutated/massaged in such a way that they work on top of the generated data without losing their characteristics in regards to selectivity and access patterns.

The proposed method can be combined with the existing "Capture & Replay" solution. That is, the original statements in the statement flow captured by the existing "Capture & Replay" solution can be replaced with the corresponding statements mutated by the solution of the present disclosure, which can then be replayed on the data generated by the solution of the present invention.

Aspects of the present disclosure will now be described with reference to the drawings.

A system for generating a test workload for a database.

Figure 1:
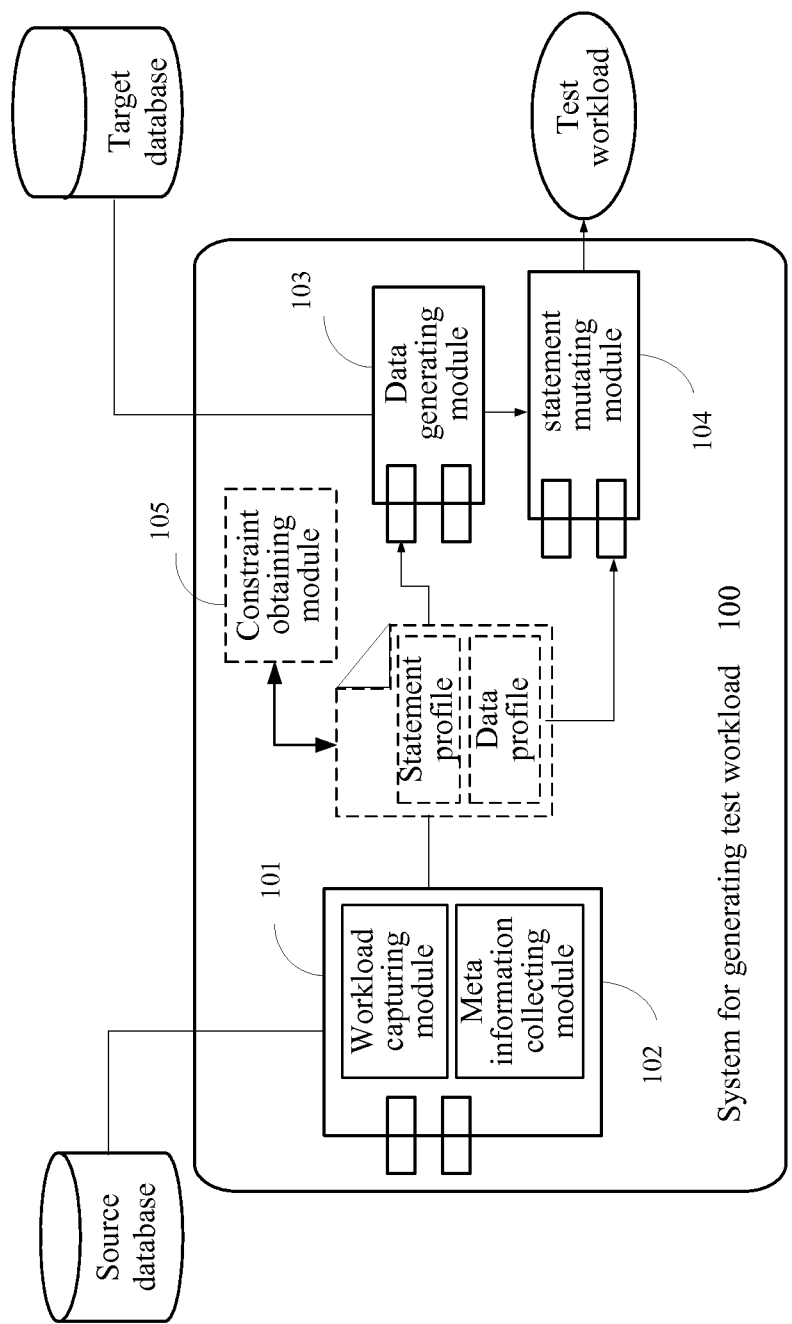
FIG. 1 illustrates a schematic architectural diagram of a system for generating a test workload for a database according to an aspect of the present disclosure.

FIG. 1 illustrates a schematic architectural diagram of a system for generating a test workload for a database according to an aspect of the present disclosure. As shown, the system 100 for generating a test workload for a database comprises a workload capturing module 101 and a meta information collecting module 102 running on the source system, and a data generating module 103 and statement mutating module 104 running on the target system.

The source system is generally a production system actually used by an enterprise, and the source database generally contains confidential information. The target system is generally a system that needs to be tested before being put into production operation. The target system and the source system may be either the same or different. The target system and the source system may comprise different versions of a same database product, or completely different database products. In the case that the two are completely different database products, conversion of the data definition languages (DDLs), etc. between the two may be needed. As known in the art, such conversion can be realized easily based on the different data schemas of the two systems.

The workload capturing module 101 is configured to capture a workload comprising database statements sent to the source database on the source system. The workload is a workload actually used by the source system during running, which comprises database statements issued by the application of the source system. Besides the database statements' text, in certain embodiments of the present disclosure, the workload capturing module 101 further captures other related information, such as statement execution frequencies, statement execution sequences, etc. In addition, in some further aspects of the present disclosure, the workload capturing module 101 further captures information such as statement elapsed time, CPU and I/O resources consumption, etc. All major relational database systems have in-built functions or tools for capturing the above information.

The system not only needs to simulate the data in the source database, but also needs to make the generated test workload simulate the performance characteristics of the workload on the source system. To this end, the performance data of the statements in the workload running on the source system also needs to be captured. The performance data is, for example, the filter factors of predicates in the statements. A filter factor is the percentage of the records in a database table that satisfy a given predicate in all the records, and it is an important index reflecting the query performance. In a database management system, a function or tool is generally provided for obtaining filter factors. Filter factors may include the filter factor of an individual predicate and the filter factor of a predicate combination having the "AND" relationship in a query.

The meta information collecting module 102 is configured to collect the data schema and data distribution statistics in the source database. According to an aspect of the present disclosure, the meta information collecting module 102 is configured to only collect the data schema and data distribution statistics in the source database involved by the database statements included in the workload. To this end, in the aspect of the present disclosure, the system 101 further comprises an identification module (not shown) configured to identify all the database objects referred to by the statements by analyzing the database statements.

A key point is to simulate on the target system the data distribution on the source system. The data distribution on the source system is represented by data distribution statistics. The data schema describes the data types and structures of the data stored in the database, are also needed for generating data in the target system. The data schema and the data distribution statistics are stored in the catalog of the database, and can be collected by anyone with sufficient authorization.

According to certain aspects of the disclosure, the data distribution statistics include the maximum, minimum, cardinality and size of the data in a column of a database table. That is, the meta information collecting module 102 collects the maximum, minimum, cardinality and size of the data in each individual column of a database table. The maximum and minimum refer to the maximum and minimum in the user data in each individual column of a database table, rather than system default values (which may be the maximum or minimum, though) when there is no user data. The cardinality refers to the number of distinct values in the column (or in a data section as part thereof). The size refers to the total number of same and different values in the column (or in a data section as part thereof).

According to certain aspects of the disclosure, the data distribution statistics include the respective occurrence frequencies of a number of values with the highest occurrence frequencies in the data in a column of a database table and the maximum, minimum, cardinality and size of each data section divided by the values. That is, the meta information collecting module 102 collects from the source database the respective occurrence frequencies of a number of values with the highest occurrence frequencies in the data in a column of a database table and the maximum, minimum, cardinality and size of each data section divided by the values.

According to certain aspects of the disclosure, the workload and other related information captured by the workload capturing module 101 are stored in a statement profile, and the data schema and data distribution statistics collected by the meta information module 102 are stored in a data profile. The statement profile comprises the database statements' text, statement execution frequencies, filter factors, and possibly elapsed times, CUP and I/O consumptions, etc. The data profile comprises the data schema and data distribution statistics. The statement profile and the data profile may be in the XML format, or in other formats. The statement profile and the data profile are provided to the data generation module 102 as described below.

In certain other aspects of the present disclosure, there may not be the statement profile and data profile, and the workload capturing module 101 and the meta information collecting module 102 directly send the captured the workload and the collected data schema and data distribution statistics to the data generation module 103 to process. In some aspects of the present disclosure, before the statement profile and data profile are provided to the data generation module 102, the information in the statement profile and data profile may be modified as appropriate to suit the conditions of the target system or to satisfy the user's requirements. For example, in the case that the target system and source system comprises different database products, it may be needed to adaptively modify the data schema in the data profile; as another example, the data distribution statistics in the data profile may be modified based on the user's requirements in order to scale the volume of data to be generated in the target database, and so on.

The data generating module 103 is configured to, based on the collected data schema in the source database, create data objects (e.g., tables, the columns in the tables) with the same data schema in a target database, and based on the collected data distribution statistics, generate data with similar data distribution characteristics in the target database. The data schema and data distribution statistics are obtained, for example, from the data profile. According to an aspect of the present disclosure, the data generating module 103 may create data objects and generate data based on the data schema and data distribution statistics included in the data profile from the source system.

Upon the data distribution statistics from the source database including the maximum, minimum, cardinality and size of the data in a column of a database table, the data generating module 103 will generate data with the same maximum, minimum, cardinality and size in the corresponding column of the corresponding table in the target database. There may be different specific methods for generating the data. For example, based on the maximum, minimum and cardinality, distinct values (which may have, for example, even intervals therebetween) between the maximum and minimum may be determined, and then this series of values may be repeated until the sized is reached.

For example, if a column has the minimum of 5, maximum of 21, cardinality of 5, and size of 10, then the following series of values may be generated: 5, 9, 13, 17, 21, 5, 9, 13, 17, 21.

For data of the character string type, it may be generated using essentially the same method simply through an ordering rule defined between different character strings.

Upon the data distribution statistics from the source database including the respective occurrence frequencies of a number of values with the highest occurrence frequencies in the data of a column of a database table and the maximum, minimum, cardinality and size of each data section divided by the values, the data generating module 103 will first generate the number of values with the highest occurrence frequencies in the corresponding column of the corresponding table in the target database, with the number of each value being its occurrence frequency, and then, based on the maximum, minimum, cardinality and size of each data section divided by the number of values, generate the data of a data section with the same maximum, minimum, cardinality and size in the column.

For example, if the values with the highest occurrence frequencies in the data of a column of a table in the source database are 7 and 12, with their occurrence frequencies being 50 and 30 respectively, the data in the column is divided into two data sections by these two values: the first data section has the minimum of 1, maximum of 6, cardinality of 5 and size of 110; the second data section has the minimum of 7, maximum of 11, cardinality of 5, and size of 10, then 50 7s and 30 12s may be generated in the corresponding column, and the method described above may be used to generate 110 values with the minimum of 1, maximum of 6 and cardinality of 5, and 10 values with the minimum of 7, maximum of 11 and cardinality of 5.

According to certain aspects of the disclosure, the system 101 further comprises: an optional constraint obtaining module 105 configured to obtain constrains related to the selectivity of the data involved by the database statements on the source system; and wherein, the data generating module 103 is further configured to generate data in the target database that satisfies or substantially satisfies the constraints related to the selectivity and with the similar data distribution statistics. The selectivity is the percentage of the records selected by a query, or the size of the result set, and can be viewed as a superordinate concept of the filter factor. The data generated in individual columns of the target database table using the above method has similar data distribution statistics (including the maximum, minimum, cardinality, size, values with the highest occurrence frequencies, etc.) to the data in the corresponding individual columns in the source database table; however, the data in different columns of a same source database table and the data in different columns of different source database tables may also have some constraints therebetween, which guarantee that a query executed against the data has certain selectivity.

Therefore, while the data generated in the target database guarantees similar data distribution statistics in individual columns, it should further guarantee that similar constraints exist between the data in the different columns of the corresponding same target database table, and the data in the different columns of the corresponding different target database tables, so that the query executed against the data in the target database will has a similar selectivity. The constraints related to the selectivity of the data involved by the database statements on the source system may be obtained by analyzing the predicates, the relationships between the predicates, the filter factors of the predicates, and the filter factors of the predicate combinations with "AND" relationships in the database statements in the captured workload stored, for example, in the statement profile (or obtained otherwise from the source system). Then, the constraints may be stored in the data profile.

According to certain aspects of the disclosure, the system 101 further comprises: an optional predicate classification module (not shown) configured to classify predicates and combinations thereof in the database statements into different groups based on the involved columns of database tables; an optional occurrence frequency calculating module (not shown) configured to calculate the occurrence frequencies of the predicates and combinations thereof in different groups in the database statements; and wherein the constraint obtaining module 105 is further configured to only obtain the filter factors of the predicates and combinations thereof in groups with higher frequencies. That is, in this embodiment, the data generated in the target database need not guarantee the constraints related to the filter factors of all the predicates and predicate combinations in all the database statements, and need only guarantee the constraints related to the filter factors of the predicates and predicate combinations with higher occurrence frequencies (thus more important, and can be given greater weights) in the database statements.

Figure 2:
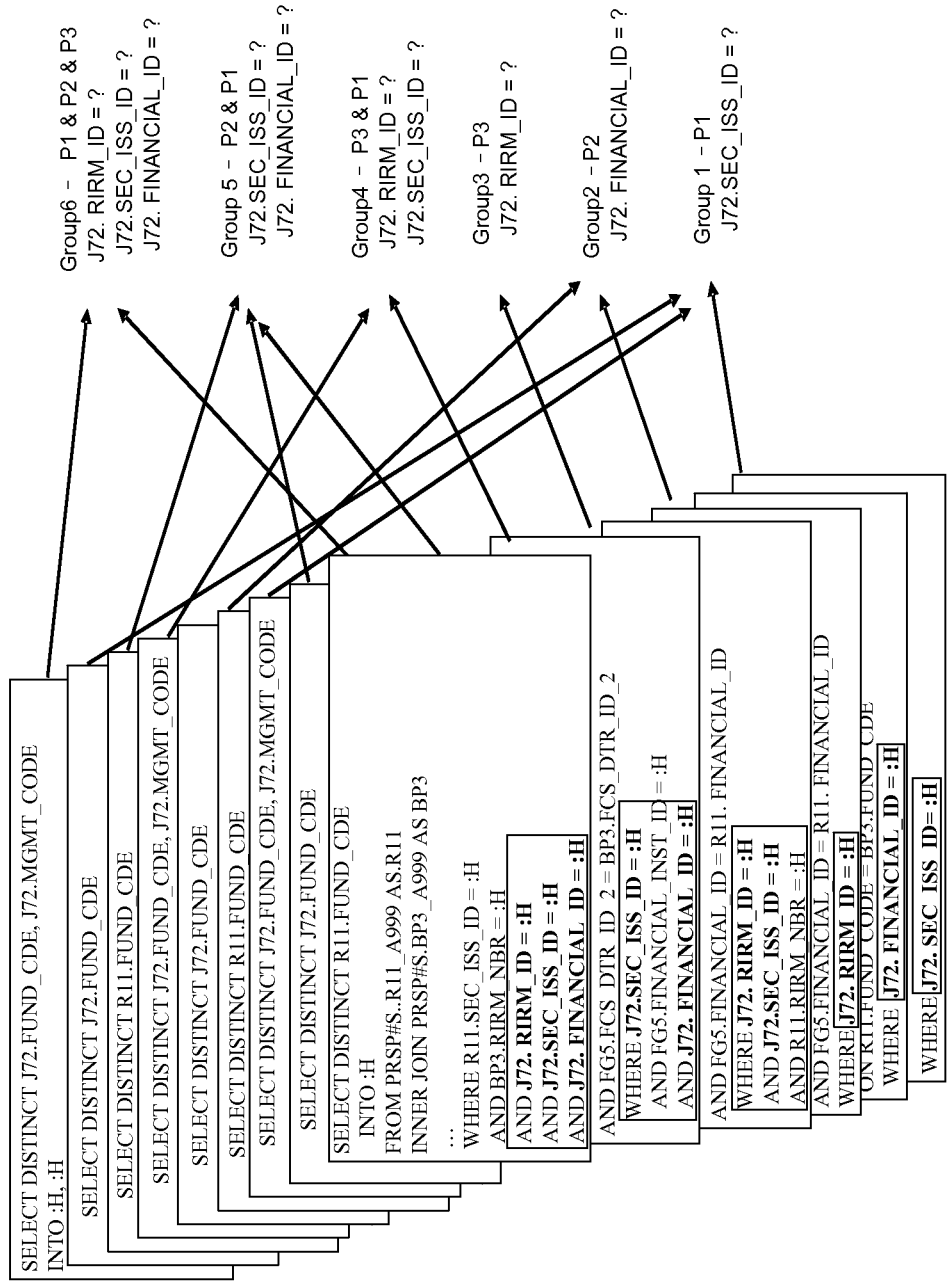
FIG. 2 exemplifies a method for classifying predicates and predicate combinations in database statements into different groups based on the involved columns of database tables.

FIG. 2 exemplifies a method for classifying predicates and predicate combinations in database statements into different groups based on the involved columns of database tables. As shown, from the set of database statements as shown, 6 predicate groups are obtained: Group1, . . . , Group6, wherein the predicates in Group1 are J72.SEC_ISS_ID=? (that is, column SEC_ISS_ID of table J72 equals to some value), which may be denoted as P1; the predicates in Group2 are J72.FINANCIAL_ID=?, which may be denoted as P2; the predicates in Group3 are J72.RIRM_ID=?, which may be denoted as P3; the predicate combinations in Group4 are J72.RIRM_ID=? AND J72.SEC_ISS_ID=?, which may be denoted as P1&P3; the predicate combinations in Group5 are J72.SEC_ISS_ID=? AND J72.FINANCIAL_ID=?, which may be denoted as P1&P2; the predicate combinations in Group6 are J72.RIRM_ID=? AND J72.SEC_ISS_ID=? AND J72.FINANCIAL_ID=?, which may be denoted as P1&P2&P3. It is to be noted that in this embodiment, each predicate group only includes predicates involving one column of one database table, or predicate combinations involving a plurality of columns of one database table, and not includes predicate combinations involving a plurality of columns of a plurality of database tables (the case of which will be handled in embodiments described below).

The table below shows that each predicate group is given a weight based on the occurrence frequency of the each predicate group as shown in FIG. 2.

| Predicate group | Predicate and predicate combination | weight |
|---|---|---|
| Group1 | P1 | 0.1 |
| Group2 | P2 | 0.2 |
| Group3 | P3 | 0.1 |
| Group4 | P1&P3 | 0.3 |
| Group5 | P1&P2 | 0.05 |
| Group6 | P1&P2&P3 | 0.25 |

It can be seen that the less important one in these predicate groups is Group5, that is, predicate combination P1&P2. Thus, when the data generating module 103 generate data in the target database, it may not consider the constraints related to the filter factor of P1&P2, and may only consider the constraints related to the other 5 groups of predicates or predicate combinations. That is, the generated data may not satisfy the filter factors of the predicate combination P1&P2, and may only satisfy the filter factors of the other 5 groups of predicates or predicate combinations. Of course, this is only an example, and the generated data may also be made to satisfy the filter factors of all the predicates and predicate combinations.

According to certain aspects of the disclosure, the constraints related to the selectivity of the data involved by the database statements comprise constraints related to the filter factors of a plurality of predicates in a database statement involving a plurality columns of a same database table, and wherein, the data generating module 103 is further configured to: first generate data satisfying or substantially satisfying the filter factors of predicates or combination thereof involving more columns, and then generate data satisfying or substantially satisfying the filter factors of predicates or combination thereof involving less columns. That is, the constraint obtaining module 105 will analyze the database statements, for example, in the captured workload, to obtain a plurality of predicates (including individual predicates and predicate combinations with a "AND" relationship) involving a plurality of columns of a same database table, as well as the filter factors of these predicates and predicate combinations, and the data generated by the data generating module 103 needs to satisfy or substantially satisfy the filter factors of all these predicates and predicate combinations; while the method of making the data generated by the data generating module 103 satisfy or substantially satisfy the filter factors of all the predicates or predicate combinations is to generate successively data satisfying or substantially satisfying the filter factors of predicates involving more columns, and data satisfying or substantially satisfying the filter factors of predicates involving less columns.

Figure 3A:
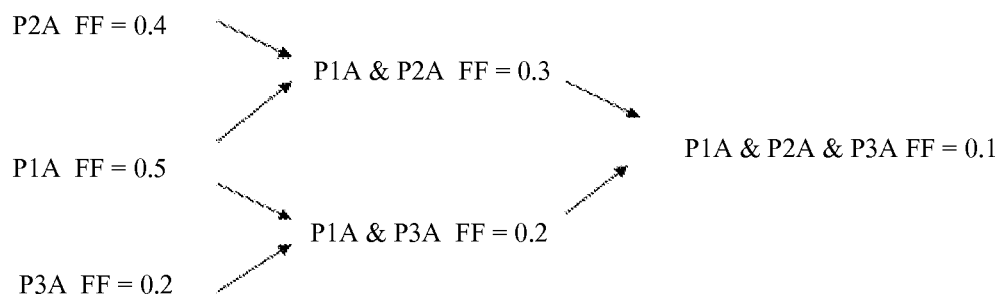
FIG. 3A exemplifies a plurality of predicates or predicate combinations involving a plurality of columns of the same database table, their respective filter factors and the relationships among the filter factors.

FIG. 3A exemplifies a plurality of predicates or predicate combinations involving a plurality of columns of a same database table, their respective filter factors and the relationships among the filter factors. As shown, there are predicates or predicate combinations as follows: P1A, whose filter factor FF=0.5; P2A. whose filter factor FF=0.4; P3A, whose filter factor FF=0.2; P1A&P2A, whose filter factor FF=0.3; P1A&P3A, whose filter factor FF=0.2; P1A&P2A&P3A, whose filter factor FF=0.1. In this figure, individual predicates are placed at the leftmost, and predicate combinations are successively placed to the right, with those involving the more predicates placed the more to the right, and predicate combinations or predicates having a combination relationship are connected with an arrow therebetween. Such an arrangement not only indicates combination relationships among predicates, but more importantly indicates relationships among the filter factors of predicates or predicate combinations.

For example, the filter factor of P1A&P2A&P3A is FF=0.1, and the filter factor of P1A&P2A connected to the left is FF=03. This indicates that the number of records satisfying P1A&P2A&P3A is 10% of the total number of records, and the number of records satisfying P1A&P2A is 30% of the total number of records; however the number of records of 30% satisfying P1A&P2A actually includes the number of records of 10% satisfying P1A&P2A&P3A (as well as the number of records of 20% satisfying P1A&P2A but not satisfying P3A). Based on this, according to certain aspects of the disclosure, firstly data satisfying the filter factors of the predicate combinations involving the most columns is created in the target database table, and then successively data satisfying the filter factors of predicates or predicate combinations involving less columns is created in the target database, thus eventually data satisfying the filter factors of all the predicates or predicate combinations is created in the target database.

Figure 3B:
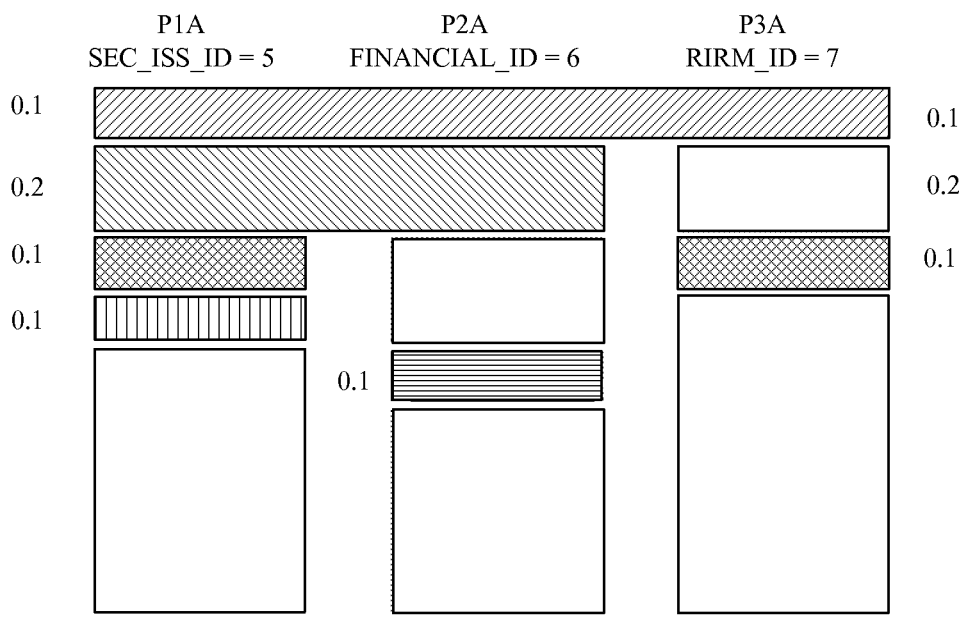
FIG. 3B exemplifies a schematic process of generating data satisfying the filter factors of the plurality of predicates and predicate combinations shown in FIG. 3A.

FIG. 3B exemplifies a schematic process of generating data satisfying the filter factors of the plurality of predicates and predicate combinations shown in FIG. 3A. As shown, the predicate P1A is specifically SEC_ISS_IDD=5, the predicate P2A is specifically FINANCIAL_ID=6, the predicate P3A is specifically RIRM_ID=7. This figure schematically illustrates three columns SEC_ISS_IDD, FINANCIAL_ID, and RIRM_ID of a database table and the process of generating data in each column. From the top down, firstly records of 10% of the total number of records satisfying P1A&P2A&P3A are created in the three column, then records of 20% satisfying P1A&P2A but not satisfying P3A are created in the two columns SEC_ISS_ID and FINANCIAL_ID (since 0.3−0.1=0.2), then records of 10% satisfying P1A&P3A but not satisfying P2A are created in the two columns SEC_ISS_ID and RIRM_ID (since 0.2−0.1=0.1), then records of 10% satisfying P1A but not satisfying P2A nor satisfying P3A are created in SEC_ISS_ID (since 0.5−0.1−0.2−0.1=0.1), and finally records of 10% satisfying P2A but not satisfying P1A nor satisfying P3A are created in the column FINANCIAL_ID (since 0.4−0.1−0.2=0.1), and no new records are created in the column RIRM_ID (since 0.2−0.1−0.1=0). Thus, the data satisfying both the filter factor of each individual predicate and the filter factor of each predicate combination is created in the target database table. After the data satisfying each predicate and predicate combination is created in the database table, the method described above may be used to subsequently create data satisfying the data distribution statistics in the source database table in the remaining records of each individual column of the target database table.

According to certain aspects of the disclosure, the constrains related to the selectivity of the data involved by the database statements comprise constrains related to the filter factors of the predicates in a database statement involving a plurality of columns of a plurality of database tables having a join relationship therebetween; and wherein, the data generating module 103 is further configured to: make the data generated in the target database satisfy or substantially satisfy the filter factors of the predicates. That is, the constraint obtaining module 105 will analyze the database statements, for example in the captured workload, to obtain a plurality of database tables having a join relationship involved in a database statement and the join relationship between the database tables, and obtain the predicates involving a plurality of columns of these database tables and the filter factors of such predicates, while the data generating module 103 will make the data generated in the target database satisfy or largely satisfy the filter factors of such predicates. As described above, the data generated in the target database by the data generating module 103 firstly enables the data in an individual column of a database table to have similar distribution statistics to the data in the corresponding column of the source database table, and secondly enables the data in different columns of a same database table to satisfy or largely satisfy the filter factors of the predicates and predicate combinations involving these columns; however, the data in a plurality column of a plurality database tables having a join relationship involved by the predicates in a database statements should also satisfy or substantially satisfy certain constraints, that is, satisfy or substantially satisfy the filter factors of such predicates.

In other words, the data generated in the target database should enable the predicates involving a plurality of columns of a plurality of database tables having a join relationship to have the similar filter factors to those that the predicates have in the source database. The data generating module 103 may make the data satisfy or substantially satisfy the filter factors of such predicates by adjusting appropriately the data that has already been created in the columns of the database tables as described above, such as by modifying the size of the data of the columns of the target database tables to make it satisfy or substantially satisfy the filter factors of the predicates.

Figure 4:
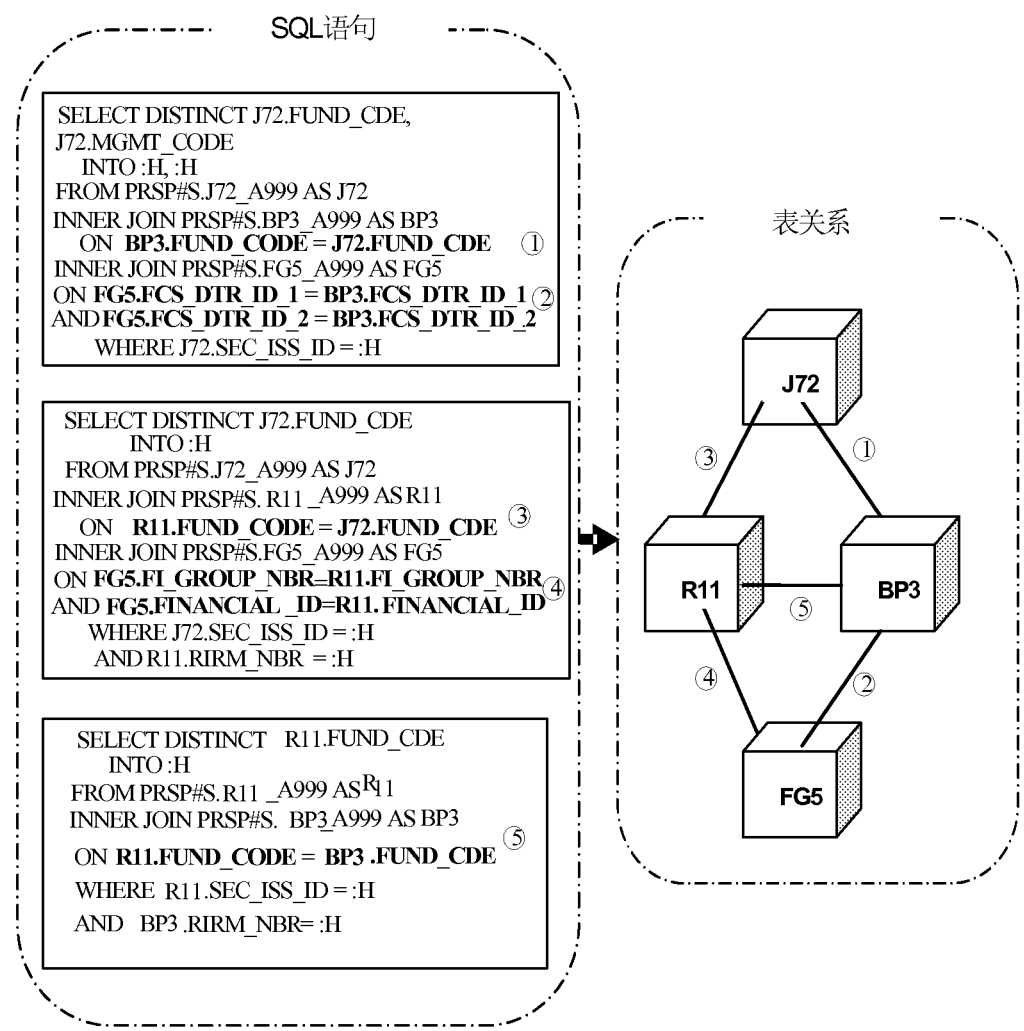
FIG. 4 illustrates a set of exemplary database statements, join relationships among a plurality of database tables obtained from the database statements, and predicates representing the relationships among the data of columns of the database tables.

FIG. 4 illustrates a set of exemplary database statements, join relationships among a plurality of database tables obtained from the database statements, and predicates representing the relationships among the data in columns of the database tables. As shown, from the predicate BP3.FUND_CODE=J72.FUND_CDE of the database statement, the join relationship ① between the tables BP3 and J72, and the relationship between the data in the columns BP3.FUND_CODE and J72.FUND_CDE of the two tables, may be obtained; from the predicates FG5.FCS_DTR_ID_1=BP3.FCS_DTR_ID_1 and FG5.FCS_DTR_ID_2=BP3.FCS_DTR_ID_2, the join relationship ② between the tables FG5 and BP3, the relationship between the data in the columns FG5.FCS_DTR_ID_1 and BP3.FCS_DTR_ID_1 of the two tables, and the relationship between the data in the columns FG5.FCS_DTR_ID_2 and BP3.FCS_DTR_ID_2, may be obtained; from the predicate R11.FUND_CODE=J72.FUND_CDE, the join relationship ③ between the tables R11 and J72, and the relationship between the data in the columns R11.FUND_CODE and J72.FUND_CDE of the two tables, may be obtained; from the predicates FG5.F1_GROUP_NBR=R11.F1_GROP_NBR and FG5.FINANCIAL_ID=R11.FINANCIAL_ID, the join relationship ④ between the tables FG5 and R11, and the relationship between the data in the columns FG5.F1_GROUP_NBR and R11.F1_GROP_NBR of the two tables, and the relationship between the data in the columns of FG5.FINANCIAL_ID and R11.FINANCIAL_ID may be obtained; from the predicate R11.FUND_CODE=BP3.FUND_CDE, the join relationship ⑤ between the tables R11 and BP3, and the relationship between the data in the columns of the two tables R11.FUND_CODE and BP3.FUND_CDE, may be obtained. The data generating module 103 may adjust the data generated in the columns of the database tables based on the obtained relationships among the columns of the tables, so as to make the adjusted data satisfy or substantially satisfy the filter factors of the predicates.

The statement mutating module 104 is configured to mutate at least some database statements in the workload captured by the workload capturing module, so that execution of the mutated database statements on the target database will have similar performance characteristics to those of execution of the original database statements on the source database, thus obtaining a test workload. According to an aspect of the present disclosure, the similar performance characteristics refer to similar predicate filter factors. The data generated in the target database in the process described above has similar data distribution statistics to those of the data in the source system, but the two are not exactly the same.

Thus, a database statement that works well on the source database may not necessarily work well on the target database. In order to make the testing have comparable performance measurement, at least some database statements in the captured workload need to be mutated. The literal values in these database statements should be substituted based on the data generated in the target database, so as to make execution of these database statement on the target database have similar performance characteristics to those of execution on the original database, that is, to make the predicates in the database statements have similar filter factors on the target database to those on the source database.

For example, a query like SELECT . . . WHERE NAME='SMITH' may return records in the source system but may return no record in the test system with the generated data since there is no record with NAME='SMITH' in the target database. Therefore, the query needs to be mutated to make it return similar results, for example, returning a similar number of records. Here mutation means that literal values appeared in queries should be replaced with values that match the newly generated data on the target system. For the above example, the query might be mutated to "SELECT . . . WHERE NAME='SSS'" if the target database table has a similar number of records with NAME='SSS'. For example, if 75% records have the value Name='SMITH' in the source database table, then about 75% records on the target system should have the value Name='SSS'.

For a query including a variable or parameter marker, the statement mutating module 104 will generate a literal value for the variable or parameter marker, and ensure that execution of the query including the literal value on the target database will return similar results to that on the source database.

According to certain aspects of the present disclosure, the system further comprises a statement validation module (not shown) configured to validate if execution of database statements in the captured workload on the target database returns similar results, such as similar number of records, to that on the source database. In such an embodiment, the statement mutating module 104 is configured to only mutate the database statements in the captured workload that cannot return similar results, and not mutate the database statements that can return similar results.

According to certain aspects of the present disclosure, the statement mutating module 104 further comprises: a statement modifying sub-module, a result set obtaining sub-module, a column value finding sub-module, and a literal substituting sub-module.

The statement modifying sub-module is configured to, for an original database statement comprising a join relationship, delete the local predicates therein, and add the columns of database tables involved in the local predicates into the SELECT clause, to obtain a modified database statement.

The result set obtaining sub-module is configured to execute the modified database statement on the target database to obtain a result set.

The column value finding sub-module is configured to find in the result set the column values the selectivities of which are similar to the individual or combined filter factors of the local predicates in the source database.

The literal substituting sub-module is configured to substitute the column values for the literals in the local predicates in the database statement comprising a join relationship.

Figure 5:
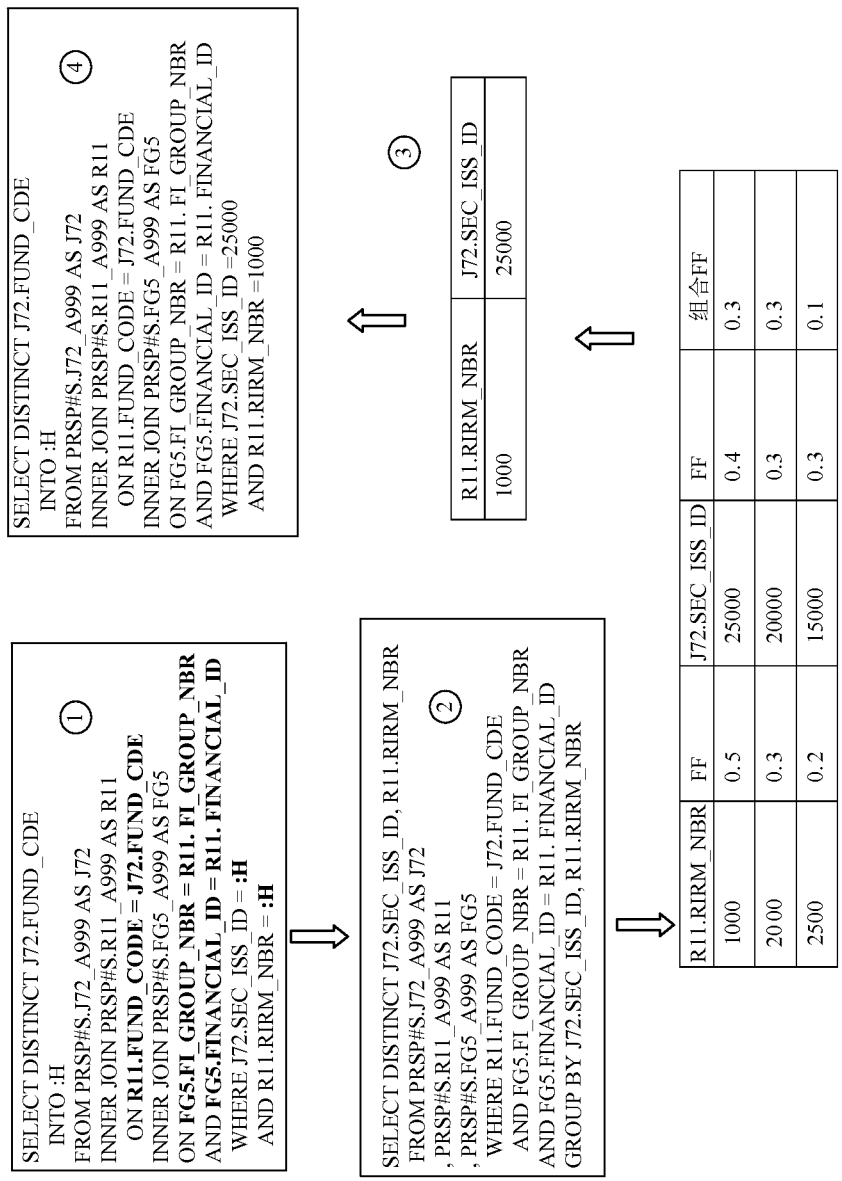
FIG. 5 exemplifies a process of mutating database statements including join relationships according to an aspect of the present disclosure.

FIG. 5 exemplifies a process of mutating database statements including join relationships according to the embodiment. As shown, for the database statement including a join relationship shown at ① in the figure, the statement modifying sub-module will delete the local predicate "Where J72.SEC_ISS_ID=:H AND R11.RIRM_NBR=:H" therein, add the columns of the database table "J72.SEC_ISS_ID" and "R11.RIRM_NBR" involved therein to the SELECT clause of the database statement, thus obtaining the modified database statement shown at ②. As shown, in order to facilitate subsequent looking up, a clause "GROUP BY J72.SEC_ISS_ID, R11.RIRM_NBR" is added to the database statement, which, however, is not necessary. The result set obtaining sub-module will execute the modified database statement on the target database to obtain the result set as shown at the bottom of the figure. The column value finding sub-module will find in the result set a set of column values of the columns involved by the local predicates as follows: R11.RIRM_NB=1000, its filter factor being 0.5; J72.SEC_ISS_ID=25000, its filter factor being 0.4; the filter factor of the combination of the two is 0.3. The filter factors of this set of column values and their combination are closest to the individual and combined filter factors of the two local predicates executing on the source database, therefore, this set of column values are selected, as shown at ③. Finally, the literal substituting sub-module will substitute the selected column values for the literals in the local predicates in the original database statement, thus obtaining the database statement modified by substitution. The database statement modified by substitution will return a similar number of records when executing on the target database to that on the source database.

According to certain aspects of the present disclosure, the system 100 further comprises: an optional test workload executing module (not shown) configured to execute the test workload on the target database perform testing on the target database. The test workload executing module may be, for example, an application driver that executes the test workload generated by the statement mutating module 104 against the target database to simulate the behavior of the application in the source system.

Usually, the application driver may also include logics for comparing the test execution results with expected results which may be, for example, the results of executing the workload in the source system. The results comparison may include both comparison of functional results and comparison of performance results. The performance results may include, for example, statement elapsed time, CPU and I/O resources consumption, etc. If the test execution results differ significantly with the expected results, it can be determined that there may be a problem in the target system (e.g., the database management system). Further, the application driver may output a report including the comparison results and the determined possible problem.

While above is described a system 100 for generating a test workload for a database according to an aspect of the present disclosure, it should be pointed out that the above description is only exemplary, rather than limitation to the present disclosure. In other embodiments of the present disclosure, the system 100 may have more, less or different modules, and the relationships of containment, linking, function, etc. among the modules may be different from those that are described. For example, the constraint obtaining module 105, predicate classification module, occurrence frequency calculating module may reside either at the source system, or at the target system, or even within the data generating module 103, and so on.

A method for generating a test workload for a database.

Figure 6:
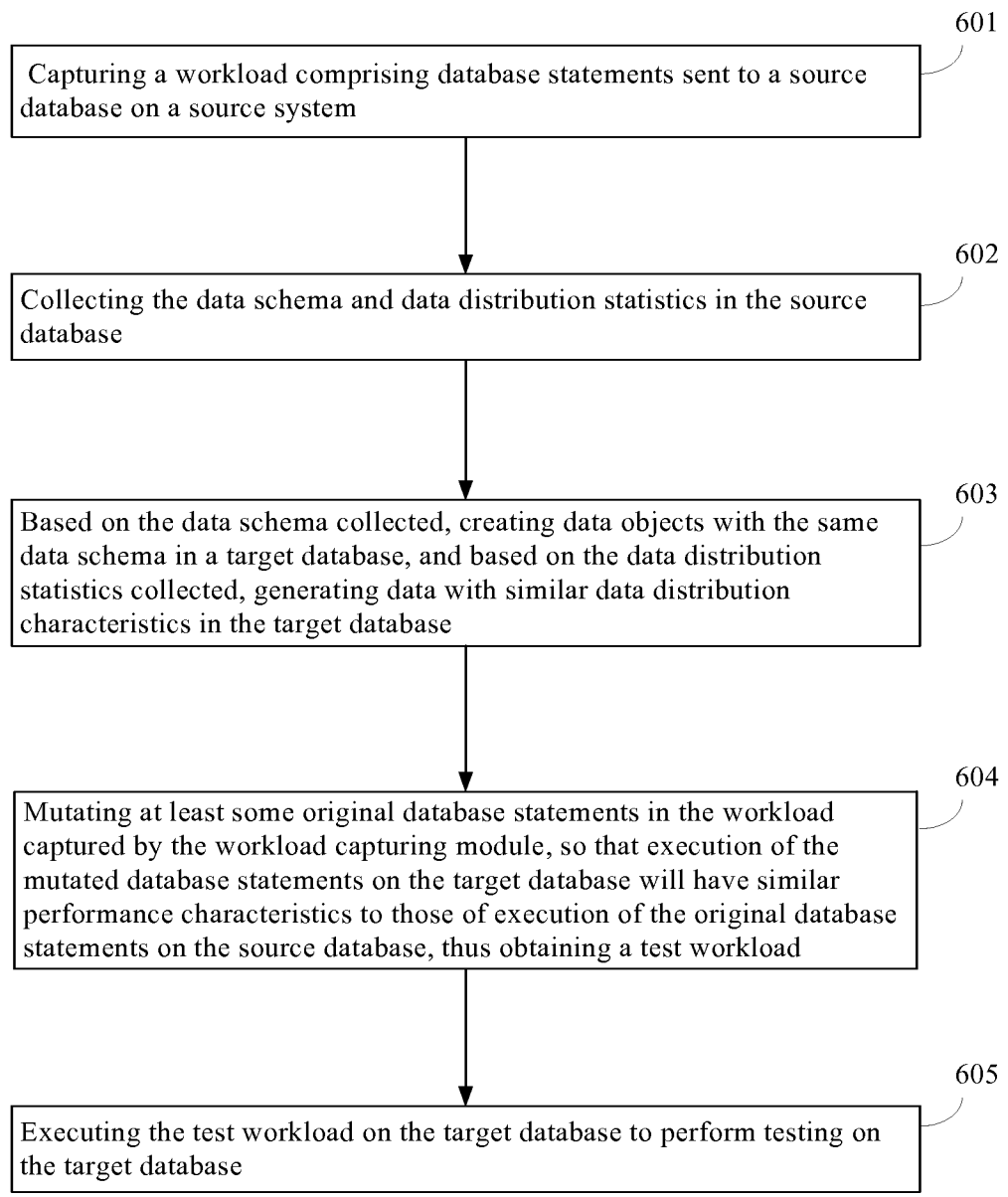
FIG. 6 illustrates a method for generating test workload for a database according to an aspect of the present disclosure.

In another aspect of the present disclosure, there is further provided a method for generating a test workload for a database. FIG. 6 illustrates a method for generating a test workload for a database. As shown, the method comprises the following steps:

At step 601, capturing a workload comprising database statements sent to a source database on a source system.

At step 602, collecting the data schema and data distribution statistics in the source database.

At step 603, based on the data schema collected, creating data objects with the same data schema in a target database, and based on the data distribution statistics collected, generating data with similar data distribution characteristics in the target database.

At step 604, mutating at least some original database statements in the workload captured by the workload capturing module, so that execution of the mutated database statements on the target database will have similar performance characteristics to those of execution of the original database statements on the source database, thus obtaining a test workload.

According to certain aspects of the present disclosure, the method further comprises the following optional step 605: executing the test workload on the target database to perform testing on the target database.

According to certain aspects of the present disclosure, the collecting the data schema and data distribution statistics in the source database comprises only collecting the data schema and data distribution statistics in the source database involved by original database statements included in the workload.

According to certain aspects of the present disclosure, the similar performance characteristics refer to similar predicate filter factors.

According to certain aspects of the present disclosure, the data distribution statistics include the maximum, minimum, cardinality and size of the data in a column of a database table, or the respective occurrence frequencies of a number of values with the highest occurrence frequencies in the data of a column of a database table and the maximum, minimum, cardinality and size of each data section divided by the values.

According to certain aspects of the present disclosure, the method further comprises: obtaining constrains related to the selectivity of the data involved by original database statements on the source system; and wherein, the generating data with similar data distribution characteristics in the target database further comprises generating data in the target database that satisfies or substantially satisfies the constraints related to the selectivity and with the similar data distribution statistics.

According to certain aspects of the present disclosure, the constrains related to the selectivity of the data involved by original database statements comprise constraints related to the filter factors of a plurality of predicates in an original database statement involving a plurality of columns of a same database table; and wherein, the generating data in the target database that satisfies or substantially satisfies the constraints related to the selectivity and with the similar data distribution statistics further comprises: first generating data satisfying or substantially satisfying the filter factors of predicates or combination thereof involving more columns, and then generating data satisfying or substantially satisfying the filter factors of predicates or combination thereof involving less columns.

According to certain aspects of the present disclosure, the constrains related to the selectivity of the data involved by original database statements comprise constraints related to the filter factors of the predicates in an original database statement involving a plurality of columns of a plurality of database tables having a join relationship therebetween; and wherein, the generating data in the target database that satisfies or substantially satisfies the constraints related to the selectivity and with the similar data distribution statistics further comprises: make the data generated in the target database satisfy or substantially satisfy the filter factors of the predicates.

According to certain aspects of the present disclosure, the method further comprises the following steps: classifying predicates and combinations thereof in original database statements into different groups based on the involved columns of database tables; calculating the occurrence frequencies of the predicates and combinations thereof in different groups in database statements; and wherein the obtaining constrains related to the selectivity of the data involved by original database statements on the source system comprises only obtaining the filter factors of the predicates and combinations thereof in groups with higher frequencies.

According to certain aspects of the present disclosure, the mutating at least some original database statements in the workload captured further comprises: for an original database statement comprising a join relationship, deleting the local predicates therein, and adding the columns of database tables involved in the local predicates into the SELECT clause, to obtain a modified database statement; executing the modified database statement on the target database to obtain a result set; finding in the result set the column values the selectivity of which are similar to the individual or combined filter factors of the local predicates in the source database; and substituting the column values for the literals in the local predicates in the database statement comprising a join relationship.

While above is described a method for generating a test workload for a database according to certain aspects of the present disclosure, it should be pointed out the above description is only exemplary, rather than limitation to the present disclosure. In other embodiments of the present disclosure, the method may have more, less or different steps and the relationships of containment, sequence, function, etc. among the steps may be different from those that are described or illustrated.

From the above description, it can be seen that a key point of the present disclosure is that selectivity based data generating and statement mutation are utilized to not only ensure that the statements and generated test workload (and test application) can work with the generated data, but also to maintain the same selectivity and access pattern of the original statements/workload. Statement mutation correlates the generated data with the captured statement flow.

Another key point of this disclosure is that only meta information is copied from the source system to the target system, so owners of the source workload do not have to worry about disclosing their confidential information. In the meantime, the generated data on the target system has the same characteristics in terms of data distribution because it is generated based on the same database statistics of the source workload.

The present disclosure considers not only meta information of data but also looks at the statements in the workload to determine relationships between data structures/tables. This greatly improves the quality of the generated data since more constraints can be formulated which describe the data characteristics.

The usage of meta information for data generation as well as the statement mutation technology allow the complete decoupling of the workload from the source environment but still preserving the complete "end-to-end" characteristics. This makes it easy to package the workload so that it can be converted and applied to other environments.

Compared to existing solutions, the present disclosure has the following advantages:

(1) The solution can ensure privacy of customer's confidential information.

(2) The Selectivity of the query in simulated environment keeps the same with that in the customer's production environment, which is really important to help identify DB2 optimizer bugs.

(3) Data and statements are considered as a whole. Not only the data but the statements that drive the application are generated.

(4) All operations are implemented automatically. Testers don't have to spend lots of time on test workload generation.

Figure 7:
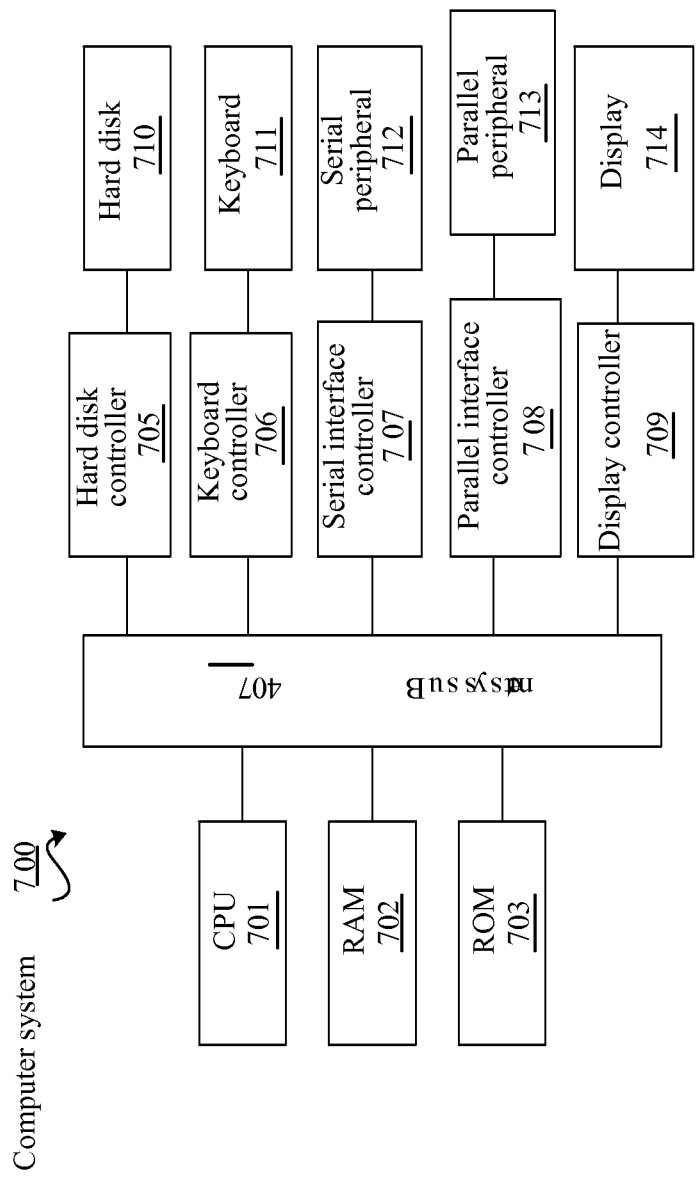
FIG. 7 illustrates a block diagram of an exemplary computing system suitable for implementing the present disclosure.

FIG. 7 shows an exemplary computer system 700 which is applicable to implement the aspects of the present disclosure. As shown in FIG. 7, the computer system 700 may include: CPU (Central Process Unit) 701, RAM (Random Access Memory) 702, ROM (Read Only Memory) 703, System Bus 704, Hard Drive Controller 705, Keyboard Controller 706, Serial Interface Controller 707, Parallel Interface Controller 708, Display Controller 709, Hard Drive 710, Keyboard 711, Serial Peripheral Equipment 712, Parallel Peripheral Equipment 713 and Display 714. Among above devices, CPU 701, RAM 702, ROM 703, Hard Drive Controller 705, Keyboard Controller 706, Serial Interface Controller 707, Parallel Interface Controller 708 and Display Controller 709 are coupled to the System Bus 704. Hard Drive 710 is coupled to Hard Drive Controller 705. Keyboard 711 is coupled to Keyboard Controller 706. Serial Peripheral Equipment 712 is coupled to Serial Interface Controller 707. Parallel Peripheral Equipment 713 is coupled to Parallel Interface Controller 708. And, Display 714 is coupled to Display Controller 709. It should be understood that the structure as shown in FIG. 7 is only for the exemplary purpose rather than any limitation to the present disclosure. In some cases, some devices may be added to or removed from the computer system 700 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for generating a test workload for a database, comprising:
   a computer hardware system having a processor, wherein the computer hardware system includes
      a workload capturing module configured to capture a workload comprising database statements sent to a source database on a source system;
      a meta information collecting module configured to collect the data schema and data distribution statistics in the source database;
      a data generating module configured to, based on the data schema collected by the meta information collecting module, create data objects with the same data schema in a target database, and based on the data distribution statistics collected by the meta information collecting module, generate data with similar data distribution characteristics in the target database; and
      a statement mutating module configured to mutate at least some original database statements in the workload captured by the workload capturing module, wherein
   execution of the mutated database statements on the target database will have similar performance characteristics to those of execution of the original database statements on the source database to obtain a test workload.

2. The system as recited in claim 1, further comprising:
a test workload execution module configured to execute the test workload on the target database to perform testing on the target database.

3. The system as recited in claim 1, wherein
the meta information collecting module is configured to only collect the data schema and data distribution statistics in the source database involved by original database statements included in the workload.

4. The system as recited in claim 1, wherein
the similar performance characteristics refer to similar predicate filter factors.

5. The system as recited in claim 1, wherein
the data distribution statistics include the maximum, minimum, cardinality and size of the data in a column of a database table, or the respective occurrence frequencies of a number of values with the highest occurrence frequencies in the data of a column of a database table and the maximum, minimum, cardinality and size of each data section divided by the values.

6. The system as recited in claim 1, further comprising:
a constraint obtaining module configured to obtain constrains related to the selectivity of the data involved by original database statements on the source system, wherein
the data generating module is further configured to generate data in the target database that satisfies or substantially satisfies the constraints related to the selectivity and with the similar data distribution statistics.

7. The system as recited in claim 6, wherein
the constrains related to the selectivity of the data involved by original database statements comprise constraints related to the filter factors of a plurality of predicates in an original database statement involving a plurality of columns of a same database table; and
the data generating module is further configured to: first generate data satisfying or substantially satisfying the filter factors of predicates or combination thereof involving more columns, and then generate data satisfying or substantially satisfying the filter factors of predicates or combination thereof involving less columns.

8. The system as recited in claim 6, wherein
the constrains related to the selectivity of the data involved by original database statements comprise constrains related to the filter factors of the predicates in an original database statement involving a plurality of columns of a plurality of database tables having a join relationship therebetween; and
the data generating module is further configured to: make the data generated in the target database satisfy or substantially satisfy the filter factors of the predicates.

9. The system as recited in claim 6, further comprising:
a predicate classification module configured to classify predicates and combinations thereof in original database statements into different groups based on the involved columns of database tables; and
an occurrence frequency calculating module configured to calculate the occurrence frequencies of the predicates and combinations thereof in different groups in database statements, wherein
the constraint obtaining module is further configured to only obtain the filter factors of the predicates and combinations thereof in groups with higher frequencies.

10. The system as recited in claim 1, wherein the statement mutating module further comprises:
a statement mutating sub-module configured to, for an original database statement comprising a join relationship, delete the local predicates therein, and add the columns of database tables involved in the local predicates into the SELECT clause, to obtain a modified database statement;
a result set obtaining sub-module configured to execute the modified database statement on the target database to obtain a result set;
a column value finding sub-module configured to find in the result set column values the selectivity of which are similar to the individual or combined filter factors of the local predicates in the source database; and a literal substituting sub-module configured to substitute the column values for the literals in the local predicates in the database statement comprising a join relationship.

11. A computer-implemented method for generating a test workload for a database, comprising:
capturing a workload comprising database statements sent to a source database on a source system;
collecting the data schema and data distribution statistics in the source database;
creating, based on the data schema collected, data objects with the same data schema in a target database;
generating, based on the data distribution statistics collected, data with similar data distribution characteristics in the target database; and
mutating at least some original database statements in the workload captured by a workload capturing module, wherein
execution of the mutated database statements on the target database will have similar performance characteristics to those of execution of the original database statements on the source database to obtain a test workload.

12. The method as recited in claim 11, further comprising:
executing the test workload on the target database to perform testing on the target database.

13. The method as recited in claim 11, wherein
the collecting the data schema and data distribution statistics in the source database comprises only collecting the data schema and data distribution statistics in the source database involved by original database statements included in the workload.

14. The method as recited in claim 11, wherein
the similar performance characteristics refer to similar predicate filter factors.

15. The method as recited in claim 11, wherein
the data distribution statistics include the maximum, minimum, cardinality and size of the data in a column of a database table, or the respective occurrence frequencies of a number of values with the highest occurrence frequencies in the data of a column of a database table and the maximum, minimum, cardinality and size of each data section divided by the values.

16. The method as recited in claim 11, further comprising:
obtaining constrains related to the selectivity of the data involved by original database statements on the source system, wherein
the generating data with similar data distribution characteristics in the target database further comprises generating data in the target database that satisfies or substantially satisfies the constraints related to the selectivity and with the similar data distribution statistics.

17. The method as recited in claim 16, wherein
the constrains related to the selectivity of the data involved by original database statements comprise constrains related to the filter factors of a plurality of predicates in an original database statement involving a plurality of columns of a same database table; and
the generating data in the target database that satisfies or substantially satisfies the constraints related to the selectivity and with the similar data distribution statistics further comprises: first generating data satisfying or substantially satisfying the filter factors of predicates or combination thereof involving more columns, and then generating data satisfying or substantially satisfying the filter factors of predicates or combination thereof involving less columns.

18. The method as recited in claim 16, wherein
the constrains related to the selectivity of the data involved by original database statements comprise constrains related to the filter factors of the predicates in an original database statement involving a plurality of columns of a plurality of database tables having a join relationship therebetween; and
the generating data in the target database that satisfies or substantially satisfies the constraints related to the selectivity and with the similar data distribution statistics further comprises: make the data generated in the target database satisfy or substantially satisfy the filter factors of the predicates.

19. The method as recited in claim 16, further comprising:
classifying predicates and combinations thereof in original database statements into different groups based on the involved columns of database tables; and
calculating the occurrence frequencies of the predicates and combinations thereof in different groups in database statements, wherein
the obtaining constrains related to the selectivity of the data involved by original database statements on the source system comprises only obtaining the filter factors of the predicates and combinations thereof in groups with higher frequencies.

20. The method as recited in claim 11, wherein the mutating at least some original database statements in the workload captured further comprises:
for an original database statement comprising a join relationship, deleting the local predicates therein, and adding the columns of database tables involved in the local predicates into the SELECT clause, to obtain a modified database statement;
executing the modified database statement on the target database to obtain a result set;
finding in the result set column values the selectivity of which are similar to the individual or combined filter factors of the local predicates in the source database; and
substituting the column values for the literals in the local predicates in the database statement comprising a join relationship.

* * * * *